Figure 1:
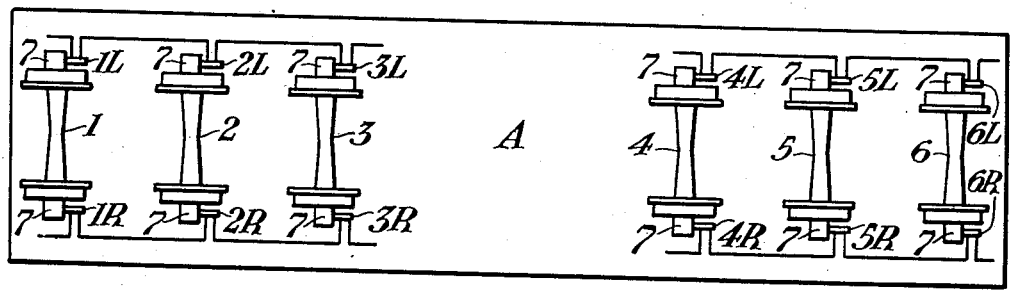

Sept. 25, 1945.  G. W. BAUGHMAN  2,385,487
HOT BEARING ALARM
Filed Aug. 31, 1944    3 Sheets-Sheet 1

INVENTOR
George W. Baughman.
BY
HIS ATTORNEY

Sept. 25, 1945.  G. W. BAUGHMAN  2,385,487
HOT BEARING ALARM
Filed Aug. 31, 1944  3 Sheets-Sheet 2

INVENTOR
George W. Baughman.
BY
HIS ATTORNEY

/ Patented Sept. 25, 1945

2,385,487

UNITED STATES PATENT OFFICE 2,385,487

HOT BEARING ALARM

George W. Baughman, Swissvale, Pa., assignor to The Union Switch & Signal Company, Swissvale, Pa., a corporation of Pennsylvania Application August 31, 1944, Serial No. 552,092

10 Claims. (Cl. 246—169)

My invention relates to a hot bearing alarm, and particularly to a hot bearing alarm suitable for use on railway passenger cars or locomotives.

One object of my invention is to provide a hot bearing alarm of the type described which will function to provide one signal when the temperatures of all of the bearings on the car or locomotive are substantially uniform, as will be the case when they are all functioning satisfactorily, and another signal, preferably an audible alarm, when the temperature of any bearing rises abnormally above the temperature of the other bearings as will be the case when a bearing becomes defective.

Another object of my invention is to provide an alarm of the type described which will function on the closed circuit principle, and the operation of which is unaffected by changes in ambient temperature.

A further object of my invention is to provide an alarm in which the operation of the alarm is dependent upon a continual comparison of the temperature of the bearings for each axle with the temperatures of the bearings for each of the other axles of the car.

According to my invention, a resistor having a large thermal coefficient of resistivity is associated with each end of each axle in such a way that it is subjected to the temperature of the associated bearing, and these resistors are connected in a special Wheatstone bridge circuit in such manner that insofar as the resistances are concerned when all of the bearings are at the same temperature, the bridge will be balanced. The bridge is arranged to be constantly connected to a source of potential the polarity of which is alternately reversed, and included in one arm of the bridge is an asymmetric element which is effective to unbalance the bridge when potential of one polarity is impressed on the bridge but not when potential of the other polarity is impressed on the bridge. To detect the unbalanced condition of the bridge a balance relay connected across the bridge through a rectifier is provided. As long as the resistances of the resistors in the various arms of the bridge remain approximately equal, the balance relay will operate its contacts in step with the reversals of the polarity of the potential impressed on the bridge, but upon a change in the resistance of any of the resistors relative to that of the other resistors the resulting unbalance of the bridge will stop the relay from operating. Furthermore, in order to check that energy of each polarity is being alternately supplied to the bridge a relay of the polar stick type is placed in series with the energizing circuit of the bridge so that its contacts will normally operate in synchronism with those of the balance relay. An alarm relay is connected through a rectifier to the secondary of a transformer having two primaries which are alternately energized in opposite directions over contacts of the checking and balance relays in step with the reversals in the polarity of the potential impressed across the bridge in a manner to cause the alarm relay to be supplied with rectified current of sufficient magnitude to maintain it energized so long as the balance and checking relays continue to operate in unison. When, however, the balance relay stops operating due to an unbalanced condition of the bridge caused by a hot journal, only one primary winding will then become energized, and the parts are so proportioned that under these conditions the level of the energy supplied the alarm relay will drop to a value which will cause this relay to release its armature. The alarm relay when energized controls one signal, and when released controls another signal.

Other objects and characteristic features of my invention will become apparent as the description proceeds.

I shall describe three forms of hot bearing alarms embodying my invention, and shall then point out the novel features thereof in claims.

Figure 2:
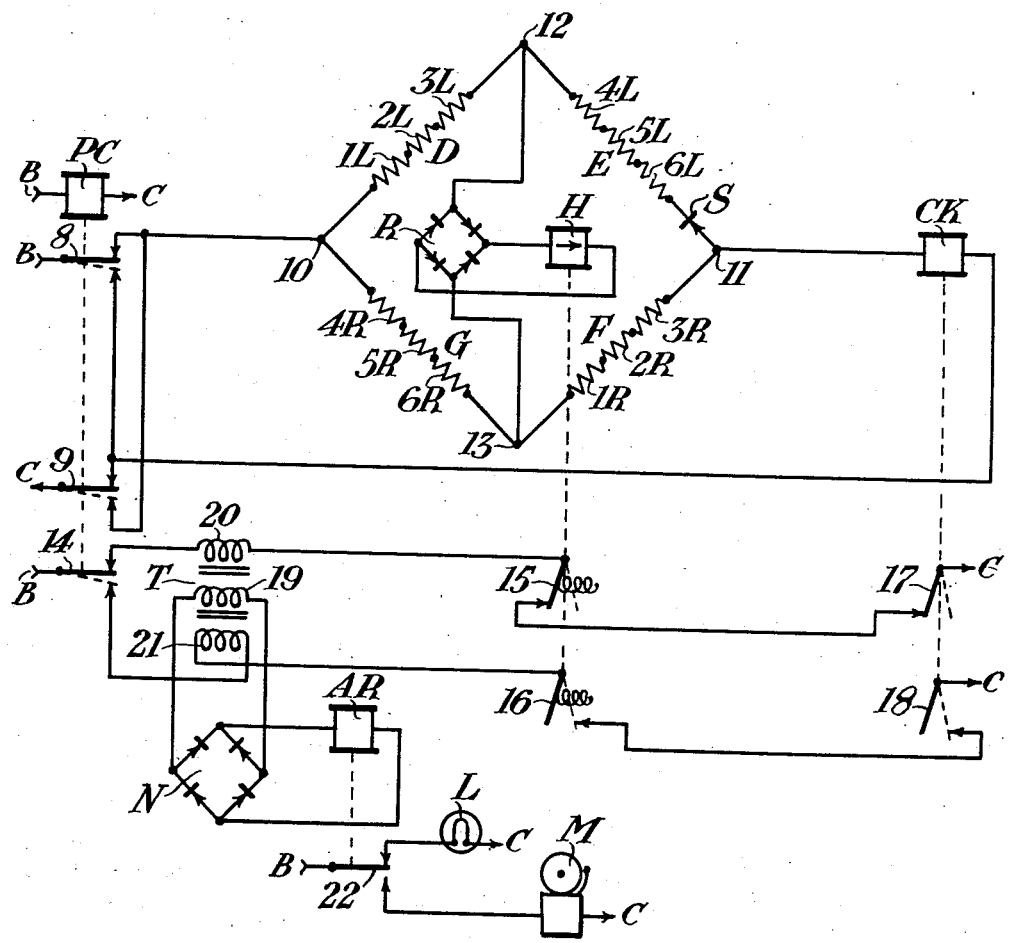
Figure 3:
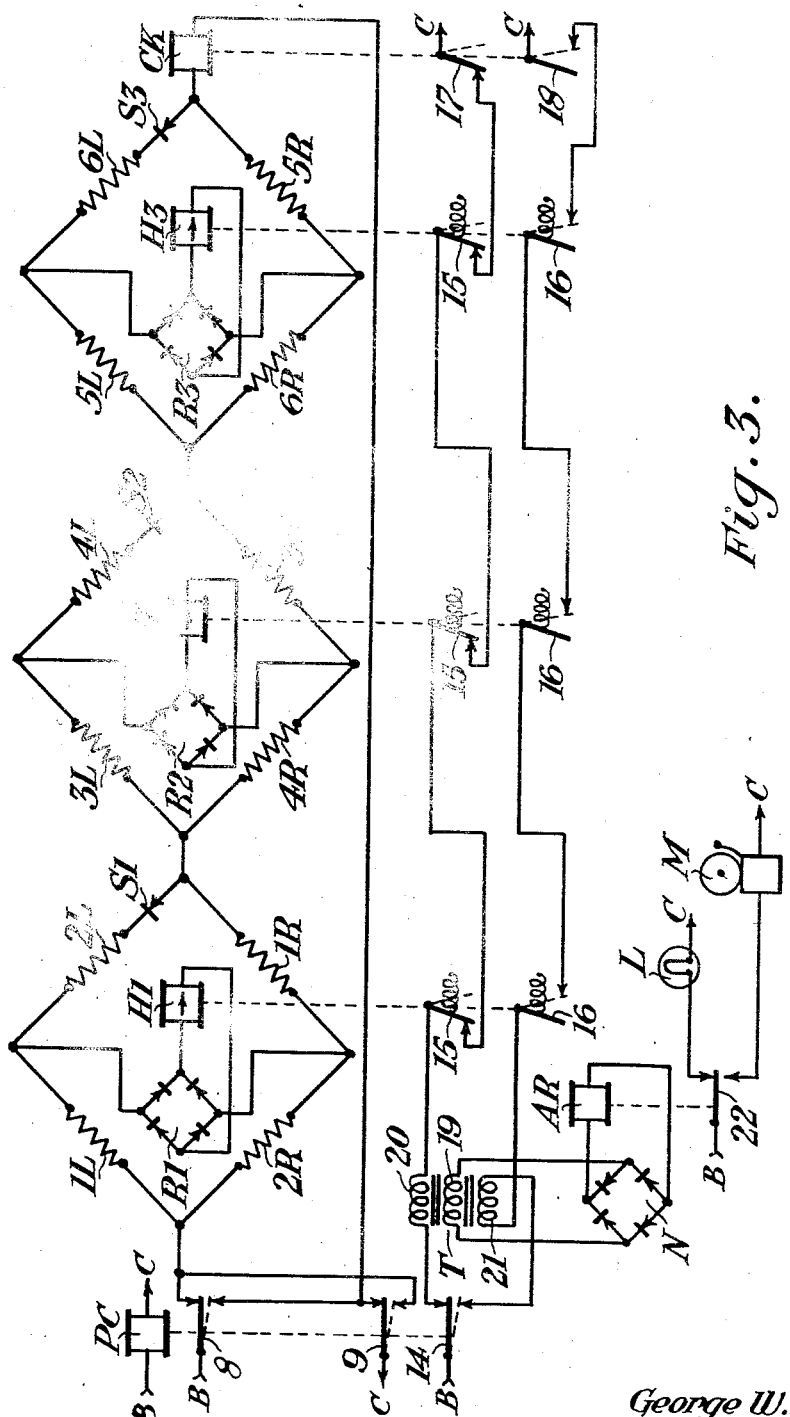
Figure 4:
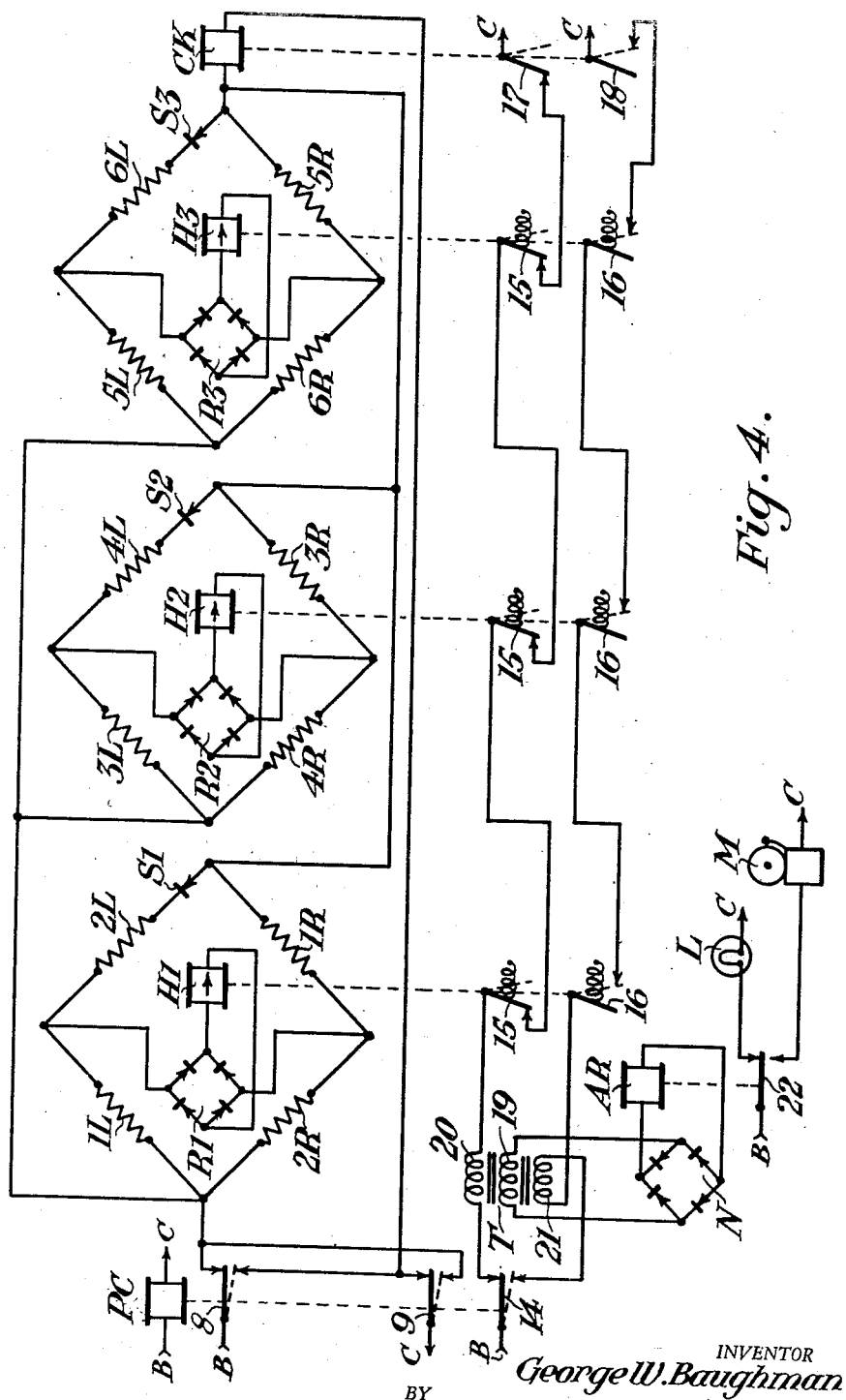

In the accompanying drawings, Fig. 1 is a diagrammatic view showing a railway car A having applied thereto certain of the elements of an alarm constructed in accordance with my invention. Figs. 2, 3, and 4 are diagrammatic views illustrating three different forms of alarms embodying my invention.

Similar reference characters refer to similar parts in each of the several views.

Referring first to Fig. 1, the reference character A designates a railway car of any usual construction, the particular car illustrated being of the two truck six axle type. The axles of the car A are designated by the reference characters 1 to 6, inclusive, and are supported at their opposite ends in any suitable type of journal boxes 7. Associated with each journal box in a manner to be constantly subjected to the temperature of the bearing is a resistor designated by the same reference character as the reference character for the associated axle with the distinguishing subscript L or R according as the resistor is disposed at the left-hand or right-hand end of the axle, as viewed from the left in Fig. 1. For example, each resistor may be mounted in a hole drilled in some part of the bearing. Each resistor is preferably of a type having a large thermal coefficient of resistivity so that its resistance will change a relatively large amount in response to the change in temperature which normally takes places in a bearing when the bearing starts to become defective, such a resistor now commonly being designated a "Thermistor."

Referring now also to Fig. 2, in the form of my invention here illustrated the three resistors at the same side of each car truck are connected in series, and the resulting four groups of resistors are connected together to form the four arms D, E, F and G of a Wheatstone bridge. It will be noted that the groups of resistors are so arranged that the resistors at the opposite ends of the same axle are in opposite arms of the bridge. This arrangement is not essential to my invention, but is preferred because it is desired that an increase in temperature of the two bearings at the opposite ends of the same axle, such for example, as might result from a bent axle, will have a cumulative effect in unbalancing the bridge for a purpose which will be made clear hereinafter. The resistors are so chosen and the parts are so proportioned that when the temperatures of all the axles are uniform, as will be the case when all of the bearings are functioning properly, the bridge insofar as the resistances of the various resistors is concerned will be substantially balanced. It will be apparent, therefore, that a change in temperature of any one of the resistors independently of a corresponding change in the temperature of the others will unbalance the bridge.

Connected across two of the opposite terminals 10 and 11 of the bridge are means for constantly impressing on the bridge a potential the polarity of which is alternately reversed at a constant rate, and connected across the other two opposite terminals 12 and 13 of the bridge are means for detecting the balanced or unbalanced condition of the bridge. The source of potential may be any convenient source of direct current, such for example, as the usual car lighting battery, and since the nature of this source is not important, only the terminals B and C thereof are shown in the drawings.

The means here illustrated for alternately reversing the polarity of the potential impressed on the bridge comprises the pole changing contacts 8 and 9 of a pole changing relay PC, although any other desired means may be used. The relay PC is of a type which when energized alternately opens and closes its front and back contacts at a constant predetermined rate, and this relay is constantly connected to the terminals B and C of the source so that it will be constantly energized. The relay PC is provided, in addition to the pole changing contacts 8 and 9, with a third contact 14, the function of which will be made clear presently. One form of relay of the type just described is disclosed in detail in Letters Patent of the United States No. 2,300,790, granted to Robert M. Laurenson on November 3, 1942, for Electrical relays.

The means for detecting the balanced or unbalanced condition of the bridge comprises a balance relay H connected to the terminals 12 and 13 through a full wave rectifier R. The relay H may be of any desired type, but as here illustrated it is a biased polar relay, one well known form of which is disclosed and claimed in Letters Patent of the United States No. 2,283,270, granted to Robert M. Laurenson, on December 4, 1941, for Electrical relay.

With the apparatus constructed in the manner thus far described, it will be apparent that since the bridge would be balanced when all of the bearings are at the same temperature, the balance relay would be continuously deenergized under these conditions. Consequently, if the relay circuit should open, the relay would remain in the same condition that it normally occupies and there would be no way to detect whether the relay was in condition to function in the event of an unbalancing of the bridge due to a defective journal bearing.

For the purpose of providing an indication that the balance relay is functioning under normal conditions, I include in one arm of the bridge, here shown as the arm E, a unit S having the characteristic of offering a relatively high resistance to current of one polarity and a relatively low resistance to current of the other polarity. Such a unit is commonly referred to as an asymmetric unit, and may for example comprise a rectifier of the dry disc type, such as the well known copper oxide rectifier. The parts are so proportioned and the unit is so arranged that when the terminal 11 is positive with respect to the terminal 10, the resistance of the unit S of itself will not be sufficient to unbalance the bridge to the extent which will cause relay H to pick up, but that when current of the opposite polarity is impressed on the bridge the resistance of the unit S will then be sufficient to unbalance the bridge to the extent necessary to cause relay H to pick up. It will be apparent therefore that as long as the resistances of the resistors in the bridge remain substantially uniform relay H will alternately operate its contacts in step with the reversals in the polarity of the current impressed on the bridge but that upon an unbalance of the bridge resulting from a change in resistance of any of the resistors of the bridge relative to that of any of the other resistors relay H will become continuously energized.

The relay H is provided with two contacts 15 and 16, the contact 16 being closed when the relay is deenergized and the contact 15 being closed when the relay is energized as shown. For convenience, I shall hereinafter refer to the contacts 15 and 16 as normal and reverse contacts respectively.

In order to check that energy of first one polarity and then the other is being alternately supplied to the bridge, a checking relay CK of the polar stick type is connected in series in the energizing circuit for the bridge. This relay is provided with a normal contact 18 and a reverse contact 17, and in normal operation, these contacts will become alternately operated in step with the contacts of the relay PC and the relay H. However, if an open circuit should develop in the energizing circuit for the bridge, this relay will then remain continuously in one or the other of its operated positions, and the contact 17 or 18, as the case may be, will become continuously closed.

The reference character AR designates an alarm relay the winding of which is connected with the secondary winding 19 of a transformer T through a full wave rectifier N. The transformer T has two primary windings 20 and 21, the one of which 20 is connected with the terminals B and C of the source over the front point of contact 14 of relay PC, reverse contact 15 of the balance relay H, and reverse contact 17 of the check relay CK, and the other winding 21 of which is connected with the terminals B and C over the back point of contact 14 of relay PC, normal contact 16 of the balance relay H and normal contact 18 of relay H.

As long as the bridge is in balance, and the apparatus is functioning properly, the contacts of the relay PC, the relay H and the checking relay CK will all operate in approximate synchronism, and the parts are so arranged and so proportioned that under these conditions the two primary windings 20 and 21 will become alternately energized by pulses of opposite polarity and will cause to be induced in the secondary winding 19 of transformer T sufficient alternating current to pick up the alarm relay AR and retain it in its picked-up condition.

If, however, the bridge becomes unbalanced due to a defective bearing, the resulting abnormal flow of current through the balance relay H will cause it to stop operating in synchronism with the relays PC and CK and under these conditions, the decoding transformer will receive pulses through only one of its primary windings. The parts of this transformer are so proportioned that under these conditions relay AR will become released and remain released. In a similar manner, any other condition which would cause either the relay H or the relay CK to remain in one position will result in pulses being delivered to only one of the primary winding of the transformer T and will thus cause the relay AR to release.

The relay AR may be used to control any suitable indication means for indicating when the apparatus is functioning properly and there are no defective bearings, and when there is either a defective bearing or a failure of the apparatus to operate in its normal manner.

As here shown, the indicating means for indicating when the apparatus is functioning properly and there are no defective bearings comprises an electric lamp L which is connected with the terminals B and C of the source over a front point of contact 22 of the alarm relay AR, while the indicating means for indicating when there is either a defective bearing or a failure of the apparatus to function in its normal manner comprises a bell M which is connected with the terminals B and C of the source over a back point of contact 22 of the alarm relay AR. It will be obvious that the lamp L or the bell M will become energized according as the relay AR is picked up or released. It will also be obvious that the lamp and bell may be placed at any desired location on the car or train.

It should be pointed out that the rectifier R is included in the balance relay circuit so that the balance relay will always become energized in the same direction regardless of the direction of the unbalance which may occur in the bridge circuit. If for example, the high resistance should occur in the upper left arm D of the bridge, the flow of current through the balance relay circuit would be from the top of the diagram to the bottom, whereas if the high resistance should occur in the upper right arm E then the flow of current in the balance relay circuit would be reversed. In both instances, however, due to the rectifier, the current would flow through the relay H in the same direction.

It is believed that the operation as a whole of the apparatus shown in Fig. 2 will be apparent from the foregoing description without further detailed description.

Referring now to Fig. 3, I have here shown a modified form of my invention employing three Wheatstone bridges connected in series. Each bridge is identical with the bridge shown in Fig. 2 except for the fact that each arm of the bridge comprises a single resistor instead of three resistors connected in series. The resistors are designated by the same reference characters as in the preceding views, and are preferably connected in the associated bridges in such manner that the two resistors at the opposite ends of the same axle are in opposite arms of the bridge for the same reasons that the two resistors at the opposite ends of the same axle are placed in opposite arms of the bridge shown in Fig. 2. The balance relay, rectifier, and asymmetric unit for each bridge are likewise designated by the same reference characters as the corresponding devices in Fig. 2 with a suitable distinguishing subscript. The contacts 15 of the balance relays H1, H2 and H3 are all connected in series in the energizing circuit for the primary winding 20 of transformer T, and the contacts 16 of the relays H1, H2 and H3 are all connected in series in the energizing circuit for the primary winding 21 of transformer T. The remainder of the apparatus shown in Fig. 3 is identical with the corresponding apparatus shown in Fig. 2.

In operation, as long as the bridges are all in balance and the apparatus is all functioning properly the contacts of the relays PC, H1, H2, H3 and CK will all operate in approximate synchronism, and under these conditions the primary windings 20 and 21 will become alternately energized by current pulses of opposite polarity and will cause sufficient current to be induced in transformer T to retain relay AR in its picked-up position. With this relay picked up, lamp L will be lighted and bell M will be silent. If, however, any one of the bridges becomes unbalanced due to a hot bearing, the associated relay H will then become continuously energized and will thus cause the energy level in the transformer T to drop to a value which will cause relay AR to release. The releasing of this relay will extinguish the light L and will energize the bell M to thus provide an audible alarm that there is a defective bearing in the car.

One advantage of the apparatus shown in Fig. 3 over that shown in Fig. 1 is that since each arm of each bridge comprises a single resistor, the resulting unbalance of the bridge which takes place when a bearing becomes defective will be greater, and it follows therefore that the arrangement shown in Fig. 3 is somewhat more sensitive than the arrangement shown in Fig. 2.

Referring next to Fig. 4, the modified form of my invention here shown is similar to that shown in Fig. 3 except that the three bridges are connected in parallel rather than in series. The operation of the apparatus shown in Fig. 4 is similar to that of the apparatus shown in Fig. 3, and will be apparent from the foregoing description and from an inspection of the drawings without further detail description.

It will be understood that while the three alarms described above have been described in connection with a six axle car they can readily be adapted in an obvious manner to a car or locomotive having any other number of axles. It will also be understood that in a train, each car may be equipped with similar alarm apparatus. In this event, however, it may be desirable to provide a single lamp and single bell controlled by all of the alarm relays instead of a separate lamp and bell for each car.

One advantage of an alarm embodying my invention is that since in normal operation the contacts of the pole changing, balance and checking relays all operate in unison, and since the alarm relay is normally energized, an open circuit or short circuit of any of the component parts will result in an alarm being given rather than a failure to give an alarm. That is to say, the apparatus operates on the closed circuit principle. This is very important since a failure of the system to function might otherwise result in a failure to detect a defective bearing which latter may readily cause loss of life or property.

Another advantage of an alarm embodying my invention is that since the operation of the alarm is dependent upon a continual comparison of the temperature of each bearing of each axle with the temperatures of the bearings for each of the other axles of the car, the alarm is unaffected by changes in ambient temperature.

While I have herein shown and described only three forms of bearing alarms embodying my invention, it is understood that various changes and modifications may be made therein within the scope of the appended claims without departing from the spirit and scope of my invention.

Having thus described my invention, what I claim is:

1. Apparatus for comparing the relative temperatures in a plurality of zones comprising a plurality of resistors one subjected to the temperature in each of said zones, said resistors being disposed in a Wheatstone bridge in such manner that when all of said zones are at approximately the same temperatures said bridge will be balanced but that a change in temperature of one zone relative to any other zone will unbalance said bridge, means for normally periodically unbalancing said bridge, and indication means controlled by said bridge and effective to provide one indication when said bridge is being periodically unbalanced due to said unbalancing means and another indication when said bridge is unbalanced due to said resistors.

2. Apparatus for comparing the relative temperatures in a plurality of zones comprising a plurality of resistors one subjected to the temperature in each of said zones, said resistors being disposed in a Wheatstone bridge in such manner that when all of said zones are at approximately the same temperatures said bridge will be balanced but that a change in temperature of one zone relative to any other zone will unbalance said bridge, means for normally periodically unbalancing said bridge, and indication means selectively responsive to the unbalancing of said bridge by said unbalancing means and by said resistors.

3. Apparatus for comparing the relative temperatures of at least two zones comprising a Wheatstone bridge having resistance elements therein subjected to the temperatures of said two zones respectively and effective upon a change of resistance of one zone relative to the other to unbalance said bridge, means for periodically unbalancing said bridge, and means selectively responsive to the periodic unbalancing of said bridge and to the unbalancing of said bridge due to said resistors.

4. Apparatus for detecting a change in temperature of one zone relative to another comprising a Wheatstone bridge having resistors therein subjected to the temperatures of said two zones and effective upon a change in temperature of one zone with respect to the other for unbalancing said bridge, means for constantly supplying said bridge with current the polarity of which is periodically reversed, means in one arm of said bridge for unbalancing the bridge when said bridge is supplied with current of one polarity but not when it is supplied with current of the opposite polarity, and means for differentiating between the unbalanced condition of said bridge due to said resistors and that due to said unbalancing means.

5. Apparatus for detecting an abnormal heat condition in the bearings of a railway car truck comprising a Wheatstone bridge having a separate resistor in each of the four legs thereof, two of said resistors being exposed to the heat condition in the two bearings respectively of one axle and the remaining two resistors being subjected to the heat conditions in the two bearings of a different axle, means for energizing said bridge by current the polarity of which is periodically reversed, said resistors being so proportioned that said bridge will become unbalanced in response to a variation in the heat condition of any bearing with respect to that in any other bearing, means for normally periodically unbalancing said bridge in step with the reversals in the polarity of said current, and means selectively responsive to the two unbalanced conditions of said bridge.

6. Apparatus for detecting a change in temperature of one zone relative to another comprising a Wheatstone bridge having resistors therein subjected to the temperatures of said two zones and effective upon a change in temperature of one zone with respect to the other for unbalancing said bridge, means for constantly supplying said bridge with current the polarity of which is periodically reversed, asymmetric means in one arm of said bridge for unbalancing the bridge when said bridge is supplied with current of one polarity but not when it is supplied with current of the opposite polarity, and means for differentiating between the unbalanced condition of said bridge due to said resistors and that due to said asymmetric means.

7. Apparatus for detecting a change in temperature of one zone relative to another comprising a Wheatstone bridge having resistors therein subjected to the temperatures of said two zones and effective upon a change in temperature of one zone with respect to the other for unbalancing said bridge, means for constantly supplying said bridge with current the polarity of which is periodically reversed, means in one arm of said bridge for unbalancing the bridge when said bridge is supplied with current of one polarity but not when it is supplied with current of the opposite polarity, a biased polar relay connected with said bridge through a rectifier and normally operating its contacts in step with the reversals in the polarity of said current but retaining its contacts in one position when said bridge becomes unbalanced due to said resistors, and indication means controlled by said relay.

8. Apparatus for detecting a change in temperature of one zone relative to another comprising a Wheatstone bridge having resistors therein subjected to the temperatures of said two zones and effective upon a change in temperature of one zone with respect to the other for unbalancing said bridge, a constantly energized relay the contacts of which are periodically operated at a constant rate, an energizing circuit for said bridge including pole changing contacts of said relay, whereby said bridge is constantly supplied with current the polarity of which is periodically reversed, a polarized stick relay connected in series in said energizing circuit and operating its contacts in synchronism with those of said constantly energized relay, means in one arm of said bridge for periodically unbalancing said bridge in step with the periodic reversals of the current supplied thereto, a biased polar relay connected with said bridge through a rectifier and operating its contacts in unison with the contacts of the other relays except when said bridge is unbalanced by a change in resistance of said resistors, and indication means controlled by said three relays.

9. Apparatus for detecting a change in temperature of one zone relative to another comprising a Wheatstone bridge having resistors therein subjected to the temperatures of said two zones and effective upon a change in temperature of one zone with respect to the other for unbalancing said bridge, a constantly energized relay the contacts of which are periodically operated at a constant rate, an energizing circuit for said bridge including pole changing contacts of said relay, whereby said bridge is constantly supplied with current the polarity of which is periodically reversed, a polarized stick relay connected in series in said energizing circuit and operating its contacts in synchronism with those of said constantly energized relay, means in one arm of said bridge for periodically unbalancing said bridge in step with the periodic reversals of the current supplied thereto, a biased polar relay connected with said bridge through a rectifier and operating its contacts in unison with the contacts of the other relays except when said bridge is unbalanced by a change in resistance of said resistors, a transformer having two primary windings and a secondary winding, means controlled by the contacts of said three relays for alternately energizing said two primary windings with current of opposite polarity when and only when the contacts of said relays are all operating in unison, and an alarm relay energized from the secondary winding of said transformer when and only when said primary windings are being alternately energized with current of opposite polarity.

10. Apparatus for detecting a change in temperature of one zone relative to another comprising a Wheatstone bridge having resistors therein subjected to the temperatures of said two zones and effective upon a change in temperature of one zone with respect to the other for unbalancing said bridge, a constantly energized relay the contacts of which are periodically operated at a constant rate, an energizing circuit for said bridge including pole changing contacts of said relay, whereby said bridge is constantly supplied with current the polarity of which is periodically reversed, a polarized stick relay connected in series in said energizing circuit and operating its contacts in synchronism with those of said constantialy energized relay, means in one arm of said bridge for periodically unbalancing said bridge in step with the periodic reversals of the current supplied thereto, a biased polar relay connected with said bridge through a rectifier and operating its contacts in unison with the contacts of the other relays except when said bridge is unbalanced by a change in resistance of said resistors, a transformer having two primary windings and a secondary winding, means controlled by the contacts of said three relays for alternately energizing said two primary windings with current of opposite polarity when and only when the contacts of said relays are all operating in unison, an alarm relay energized from the secondary winding of said transformer when and only when said primary windings are being alternately energized with current of opposite polarity, and indication means controlled by said alarm relay.

GEORGE W. BAUGHMAN.